United States Patent Office 2,999,959
Patented Sept. 12, 1961

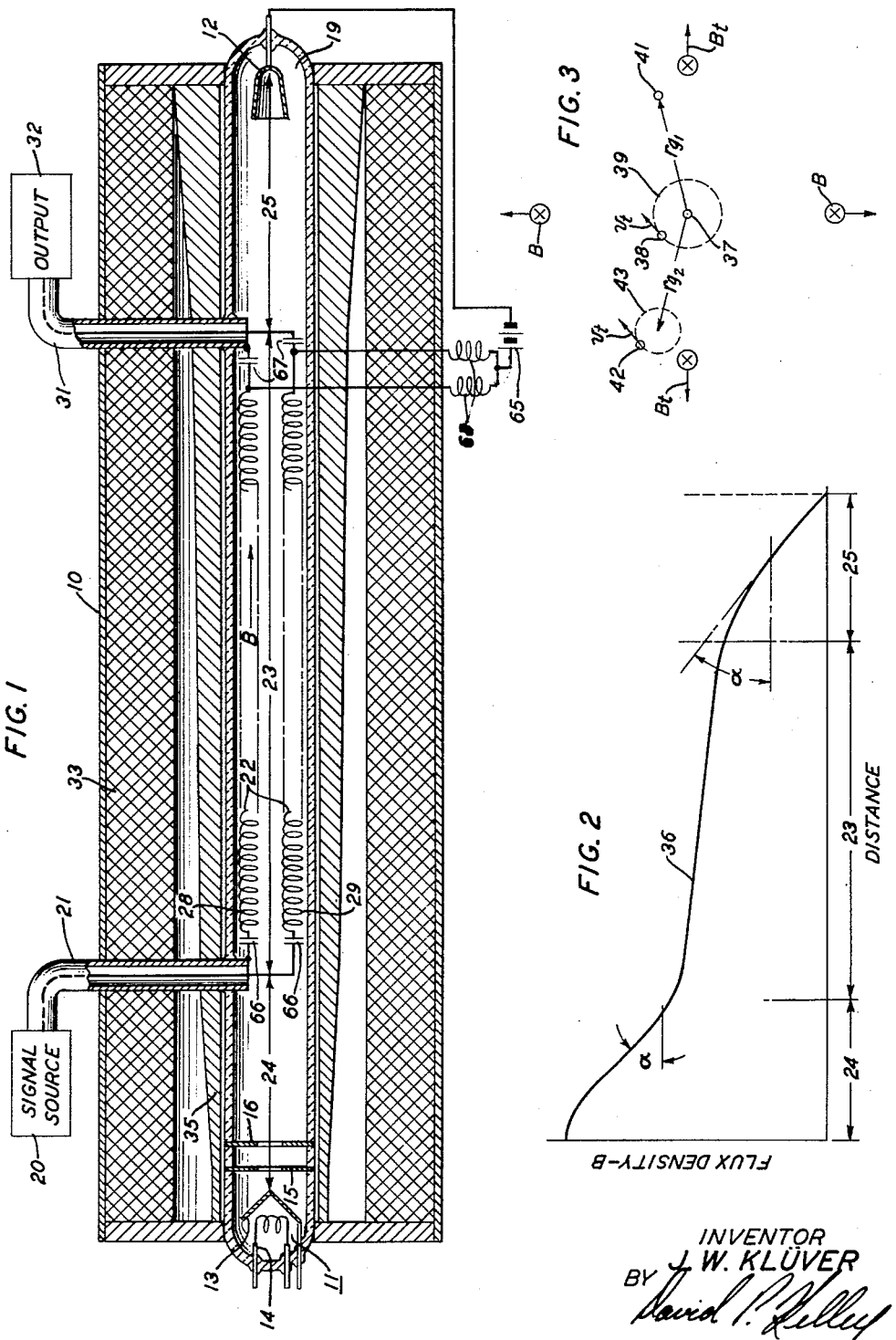

2,999,959
TRAVELING WAVE TUBE
Johan Wilhelm Kluver, Murray Hill, N.J., assignor to Bell Telephone Laboratories, Incorporated, New York, N.Y., a corporation of New York
Filed Apr. 4, 1960, Ser. No. 19,553
8 Claims. (Cl. 315—3.6)

This invention relates to traveling wave tubes and, more particularly, to traveling wave tubes which utilize transverse-field interaction.

The conventional traveling wave tube achieves electromagnetic signal wave amplification through space-charge wave modulation of an electron beam. This is accomplished by propagating the signal wave along the beam in such a manner that the phase velocity of electric field components of the wave that are parallel with the path of the beam are in approximate synchronism with the beam. These longitudinal field components produce longitudinal velocity or charge density modulations along the beam which are referred to as space charge waves. As is well known, interaction can be made to occur between the space charge waves and the signal wave to produce amplification. Although amplification through space-charge wave interaction has proven to be relatively efficient, it is becoming increasingly apparent that, for certain applications, higher efficiency amplification is imperative.

One of the major causes of reduced efficiency in a conventional traveling wave tube is the dissipation of beam kinetic energy through radiation and secondary emission when the beam impinges on a collector. One way of reducing these losses is to reduce or "depress" the potential of the collector below that of the beam so that the beam velocity is reduced prior to impingement. Due to residual longitudinal velocity modulations on the beam, however, one is forced to use a fairly high collector potential; if the collector potential is reduced too much, electrons with negative or backward longitudinal velocity components will be repelled back into the interaction region with deleterious results. Many of these troublesome velocity components can be converted to charge density modulations through the use of a lens system between the output and the collector. Because of inherent non-linearities in the beam, however, such a lens system is not always as effective as would be desired. Further, the lens system adds to the weight and mechanical complexity of the device.

Another factor which degrades the efficiency of a space charge wave or longitudinal field device is the reduction of coupling strength between the signal wave and the beam as the D.-C. velocity of the beam is reduced. When the signal wave interacts with the beam, a certain amount of beam energy is desirably given up to the wave to effect amplification. This energy interchange, however, invariably results in a reduction of beam velocity, and hence, the beam gradually falls out of synchronism with the wave. This lack of synchronism weakens the coupling between the wave and the beam and therefore lowers tube efficiency.

It has been found that these drawbacks can be substantially eliminated by the use of transverse-field interaction in conjunction with certain unique features to be discussed hereinafter. In devices that utilize transverse-field interaction, the circuit that transmits the signal wave is designed such that the electric fields associated with the wave are almost entirely transverse to the direction of flow of the beam. In the presence of a longitudinal magnetic focusing field, the resultant transverse forces produce transverse or rotational velocity components on the electrons of the beam whereby these particles are caused to follow substantially helical trajectories, and the phase positions of successive rotating electrons as they pass through a given transverse plane of the beam define a cyclotron wave. The interaction principles that apply to transverse-field or cyclotron wave devices are analogous to those that apply to longitudinal-field or space-charge wave devices.

A more detailed description of the operation of transverse-field tubes is given in Patent 2,801,361, issued July 30, 1957, to J. R. Pierce. In addition, as is described in that patent, the noise content of the beam is primarily a result of spurious transverse velocity components on the individual electrons as they leave the cathode. Accordingly, a collimator is included between the cathode and the interaction region to intercept many of the electrons having high transverse velocity components. Although this method of reducing noise is peculiar to transverse-field tubes, it does not at present compare too favorably with results obtained by space-charge wave devices, primarily because of the many recent advances made in that area. Further, beam collimation necessarily degrades tube efficiency because the portion of the beam that is intercepted is never utilized.

It is a general object of this invention to provide highly efficient electromagnetic wave amplification.

It is another object of this invention to provide low noise electromagnetic wave amplification utilizing transverse-field interaction.

It is still another object of this invention to minimize losses due to heat radiation and secondary emission at the collector of a traveling wave tube.

It is an additional object of this invention to maintain synchronism between the electromagnetic signal wave and the electron beam throughout the interaction region of a traveling wave tube.

It is a further object of this invention to obviate the necessity of a collimator for producing low noise amplification in a transverse-field type traveling wave tube.

These and other objects of my invention are attained in an illustrative embodiment thereof which comprises an electron gun for forming and projecting an electron beam toward a collector. The beam is focused by a magnetic field which is parallel with the path of the beam. A slow wave circuit extends along a portion of the beam path and is biased with a D.-C. accelerating potential to maintain a predetermined D.-C. beam velocity. The slow wave circuit is designed such that the electric fields associated with an electromagnetic signal wave propagating therealong are almost entirely transverse with respect to the direction of flow of the beam. These transverse fields produce cyclotron waves on the beam which interact with the electromagnetic signal wave in a well-known manner to produce amplification. The collector is advantageously biased as a significantly lower potential than the D.-C. accelerating potential on the slow wave circuit in order to reduce the D.-C. longitudinal beam velocity prior to collector impingement and hence, reduce the loss of longitudinal beam kinetic energy through collector dissipation.

As the interaction process takes place, a certain quantity of the D.-C. kinetic energy of the beam is converted to cyclotron wave energy which is eventually given up to the signal wave to effect amplification. As the longitudinal D.-C. velocity of the beam is reduced, the cyclotron waves would normally be expected to fall out of synchronism with the signal wave. As previously mentioned, however, a cyclotron wave is defined by the successive phase positions of individual rotating electrons as they pass through a given transverse plane of the beam. Therefore, if the rotational velocity, or the cyclotron frequency, of the electrons is gradually reduced, they will travel a longer longitudinal distance during each cycle of their rotation, and the phase velocity of the cyclotron wave will be effectively increased. Accordingly, it is one aspect of this invention that the cyclotron frequency of the electrons in the interaction region be gradually reduced to compensate for the reduced D.-C. velocity of the electron beam.

As mentioned above, the efficiency of conventional space-charge wave traveling wave tubes can be increased by lowering the potential of the collector. Such collector "depression" is limited, however, by the backward velocity components of many of the electrons. This limitation is inherently eliminated in transverse-field devices because there is substantially no modulation of the longitudinal velocity components of the beam. However, even when the D.-C. beam velocity is reduced for efficient collection, the rotational velocity of the electrons is substantially unaffected. Therefore, when the beam is collected, the rotational kinetic energy of the electrons is disadvantageously dissipated in the form of heat radiation and secondary emission. Accordingly, it is another aspect of this invention that substantially all of the residual rotational energy contained on the beam as it leaves the interaction region be converted into D.-C. kinetic energy.

As will be more fully explained hereinafter, I have found that the cyclotron wave noise content of an electron beam, or, in other words, spurious transverse velocity modulations, varies inversely with the magnetic flux density at the cathode. Accordingly, it is a feature of this invention that a very high magnetic field be provided at the cathode. I have found that this method of reducing noise in a transverse-field tube is not only more effective than prior methods of which I am aware, but also, it obviates the necessity of a beam collimator and therefore increases tube efficiency. Another source of noise, however, in addition to spurious longitudinal velocity modulations (space-charge wave noise) and spurious transverse velocity modulations (cyclotron wave noise), must be considered. This other source of noise results from spurious transverse electron displacements and is referred to in the art as synchronous wave noise. I have found that, in regions of magnetic field transition, cyclotron waves and synchronous waves may mix with resulting amplification of both waves. I have also found that if a magnetic field transition is made adiabatically, this mixing can be avoided. The term "adiabatic," as applied to a changing magnetic field, refers to a transition in which the transverse or rotational kinetic energy of a spiraling particle divided by the strength of the magnetic field remains invariant.

It is, therefore, a feature of this invention that the magnetic focusing field diverge adiabatically in the direction of beam flow along the entire length of the tube. A necessary consequence of such divergence is a constant reduction, with respect to distance, of the magnetic flux density within the electron beam. As will become clear hereinafter, this divergence of the focusing field greatly enhances tube efficiency. In order to prevent mixing of the synchronous and cyclotron noise waves, the magnetic field divergence is made adiabatic, or so gradual that these two noise quantities remain invariant. The specific conditions that define adiabatic invariance in the present device will be discussed more fully hereinafter.

It is another feature of this invention that the rate of change of flux density between the cathode and interaction region resulting from the diverging magnetic field be as rapid as the conditions of adiabatic invariance permit. For many applications of my invention, weight and size restrictions on the device are very stringent. It is therefore impractical, in such cases, to provide a high magnetic focusing field along the entire length of the tube because of the large and heavy magnet that is necessitated. Further, as will become apparent hereinafter, the signal wave velocity on the slow wave circuit must be greatly reduced to meet synchronism requirements if a very high field is used in the interaction region. Hence, the high flux density at the cathode should be reduced to some more appropriate lower value at the interaction region. By the same token, however, size requirements dictate that the distance between the cathode and interaction region be small. Consequently, the flux density gradient in this region should be as steep as the aforementioned condition of adiabatic invariance permits.

It is still another feature of this invention that the magnetic field in the interaction region diverge relatively gradually. As is well known, the cyclotron frequency in a transverse-field device is directly proportional to the flux density of the longitudinal magnetic focusing field. The gradually diverging field therefore results in a cyclotron frequency that gradually reduces with distance along the interaction region. This, in turn, compensates for the gradually reducing D.-C. beam velocity to maintain synchronism between the signal wave and the beam cyclotron waves as described hereinabove. The rate of divergence of the magnetic field in the interaction region is, of course, determined by the rate of reduction of D.-C. beam velocity. It should be added that the general condition of adiabatic invariance will inherently obtain except under certain extreme circumstances.

It is another subsidiary feature of this invention that the rate of change of flux density between the interaction region and the collector resulting from the diverging magnetic field be as rapid as the conditions of adiabatic invariance permit. Although the aforementioned low potential collector feature is effective in conserving D.-C. longitudinal beam kinetic energy, it does not prevent the dissipation of rotational beam kinetic energy. With the inclusion of a diverging magnetic field between the interaction region and the collector, however, substantially all of this rotational energy can be converted to D.-C. energy, as will be explained more fully hereinafter. It will also become apparent hereinafter that the rate of divergence of the field must be adiabatic in order to prevent the conversion of electron displacement modulations into rotational velocity modulations which would defeat, to that extent, the purpose of this feature. The flux density gradient should, however, be as steep as possible to keep the tube length at a minimum.

These and other objects and features of my invention will be more easily understood with reference to the following detailed description, taken in conjunction with the accompanying drawing, in which:

FIG. 1 is a longitudinal sectional view of a traveling wave tube illustrative of the present invention;

FIG. 2 is a graph of flux density versus distance in the electron beam of the device of FIG. 1;

FIG. 3 is a representation of the relative trajectories of three electrons of the beam of the device of FIG. 1;

Figure 5:
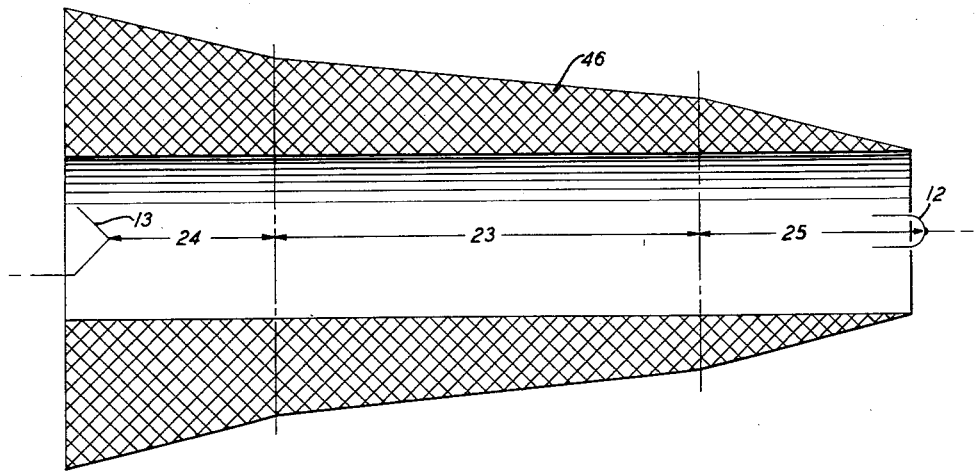
FIG. 5 illustrates, for purposes of comparison, the hypothetical trajectories of three cyclotron waves.

Referring now to FIG. 1, there is shown schematically a traveling wave tube 10 comprising an electron gun 11 for forming and projecting a beam of electrons toward a collector electrode 12. For purposes of illustration, electron gun 11 is shown as comprising a cathode 13, a heater 14, a focusing electrode 15 and an accelerating electrode 16. Since the various electrodes function in a well-known manner, voltage sources therefor have not been shown or described. Surrounding the electron gun and the collector is an envelope 19 of any suitable material which maintains the electron beam in a substantial vacuum. The beam is focused by a longitudinal magnetic field B which is produced in a known manner by solenoid 33.

An electromagnetic signal wave from a signal source 20 is introduced into tube 10 by means of a coaxial cable 21. The coaxial cable is coupled to a slow wave circuit 22 which defines an interaction region 23. Between cathode 12 and the input to slow wave circuit 22 is a gun region 24 and between the output end of the slow wave circuit 22 and collector 12 is a collector region 25. Slow wave circuit 22 comprises a first coil 28 which is coupled to the outer conductor of coaxial cable 21, and a second coil 29 which is coupled to the inner conductor of the input coaxial cable 21. As the signal wave is propagated along slow wave circuit 22, electric fields, which are transverse to the magnetic field B, are produced between coils 28 and 29. Whenever electrons in a magnetic field are subjected to forces transverse thereto, they will rotate at a velocity proportional to the magnetic field. Due to the magnetic field B, the transverse forces on the electron beam resulting from these electric fields therefore produce cyclotron waves which interact with the signal wave in a known manner to produce amplification. The amplified signal wave is removed from the tube by a coaxial cable 31 and is transmitted to an appropriate load 32. It is to be understood that the slow wave circuit as well as the input and output connections are shown merely for purposes of illustration. Various other slow wave circuits, such as bifilar helices, coupled resonators, et cetera, could alternatively be used.

Enclosed between solenoid 33 and envelope 19 is a cylindrical field shaper 35 which is made of a suitable ferromagnetic material. The size of field shaper 35, with respect to solenoid 33, has been exaggerated to illustrate its variable outside diameter; it is intended that field shaper 35 be thin enough to saturate magnetically when inserted within solenoid 33. The purpose of the field shaper 35 is to produce a magnetic flux density versus distance characteristic within the beam such as that shown by curve 36 of FIG. 2. The abscissa of the graph of FIG. 2 shows distance along tube 10 in terms of the cathode region 24, the interaction region 23, and the collector region 25, while the ordinate is a measure of flux density within the beam.

The field shaper 35 deflects the lines of flux within envelope 19, the amount of flux deflection being in proportion to the thickness of the cylindrical wall of the field shaper. Hence, at the cathode end, where the field shaper wall is quite thin, there is little flux deflection and the flux density at the cathode is quite high, as seen in FIG. 2. Likewise, at the collector end, the field shaper is relatively thick and the flux density within the beam is very low. A comparison of curve 36 of FIG. 2 and the configuration of the field shaper illustrates their relationship along the entire tube length.

Before considering in detail the function of the unique magnetic field patterns in the device of FIG. 1, a brief discussion of certain relevant beam parameters in a transverse-field device is perhaps warranted. Random noise fluctuations associated with transverse-field interaction are of two types: random transverse velocity fluctuations at the cathode and random electron displacement variations of the electrons resulting in density fluctuations over the electron beam. For purposes of illustrating these noise quantities, consider FIG. 3 which is a schematic illustration of four exemplary electrons in the cathode region 24 as seen when looking toward the collector in the direction of the magnetic field. The crosses B indicate that the direction of the longitudinal magnetic focusing field is "into the paper." The direction of the D.-C. longitudinal velocities of the electrons is in the same direction as the magnetic field.

Consider first a theoretically noiseless beam of the device of FIG. 1 to be infinitely thin, that is, a stream of electrons traveling single file to the collector. Electron 37 travels along a straight line that is coincident with the central axis of the cathode and collector. As such, it has no noise component and its position represents the theoretically ideal trajectory of the beam that has been described. Electron 38, on the other hand, has been subjected to a spurious transverse force which, together with the longitudinal magnetic field, causes it to rotate in orbit 39 about the central axis (the term "rotate" is used herein in preference to the more appropriate terms "gyrate" or "revolve" because of its wide usage in the art). The angular velocity, or cyclotron frequency of electron 38, is proportional to the longitudinal magnetic field B while its transverse velocity $v_t$ (and therefore its radius of rotation) is proportional to the spurious transverse force. Bearing in mind the longitudinal D.-C. velocity component of each of the electrons, one can see that electron 38 follows a helical trajectory. The transverse velocity component $v_t$ on electron 38 represents spurious cyclotron wave noise which directly interferes with the aforementioned cyclotron wave interaction that occurs in interaction region 23.

Electron 41 is displaced a distance of $rg_1$ from its normal position on the tube axis, but it has no transverse velocity component. A large number of such randomly displaced electrons can be analyzed in terms of wave motion. Since the only velocities of these particles are their D.-C. velocities, the waves associated with them propagate in synchronism with the D.-C. beam velocity, and are therefore called synchronous waves.

Electron 42 has received both a displacement modulation and a transverse velocity modulation. Its transverse velocity component $v_t$ results from a spurious transverse velocity modulation while the displacement $rg_2$ of its center of rotation from the tube axis results from a spurious displacement modulation. Consequently, electron 42 contributes to both the cyclotron and synchronous wave noise content of the beam.

As mentioned previously, it is desirable to reduce the cyclotron wave noise content as much as possible. I have found that this noise power generated at the cathode varies directly with $$\frac{v_t^2}{B}$$

The mathematical proof is rather involved and so has not been included herein. Suffice it to say that I have found that the deleterious noise contributions of spurious transverse velocity modulations can be reduced as the flux density B at the cathode is increased. Accordingly, it is desirable to produce a high flux density at the cathode as shown in FIG. 2.

For many reasons, it is not practical to extend the high magnetic field at the cathode over the entire tube length. For example, a high field produces a high cyclotron frequency, which results in a slow cyclotron wave phase velocity, thereby necessitating closer coil windings of the slow wave circuit 22 to provide a correspondingly slow phase velocity of the signal wave. I have found, however, that if the magnetic field is abruptly reduced to some lower value that is more appropriate for cyclotron wave interaction, the cyclotron noise waves and synchronous noise waves will mix, or couple actively, with resultant amplification of both the cyclotron and synchronous wave noise quantities. Fortunately, I have further found that this coupling can be avoided by making the magnetic field reduction adiabatic, or so gradual that the cyclotron wave and synchronous wave noise quantities remain invariant.

The necessity of reducing the magnetic field adiabatically in the present device can be appreciated with reference to FIG. 3. It is evident that a longitudinal magnetic field in a beam can be reduced with respect to distance only by diverging the lines of magnetic flux. This necessarily results in transverse flux density components, shown in FIG. 3 by the arrows $B_t$. If these components are very large, one can see that transverse forces will be exerted on displaced electrons such as electron 41; in the particular case of electron 41, the transverse flux density component, which is directed toward the right, will act with the D.-C. electron velocity which is directed into the paper to produce, by the left-hand rule, a downward force. Such transverse forces, of course, add to the cyclotron wave noise content of the beam. If, on the other hand, the magnetic field transition is so gradual that the cyclotron wave noise content $$\frac{v_t^2}{B}$$

of an electron remains invariant, then no additional cyclotron wave noise will be introduced to electron 41 because $$\frac{v_t^2}{B}$$

will remain invariant. It should be noted in passing that although $$\frac{v_t^2}{B}$$

remains invariant, $v_t$ decreases when B decreases so that the net rotational kinetic energy of a rotating electron is reduced. This phenomenon will be discussed later with reference to the collector section 25.

From the foregoing, it is evident that the slope of the curve 36 of FIG. 2 cannot exceed some predetermined maximum if the conditions of adiabatic invariance are to be fulfilled. I have found that, for a linear variation of the magnetic field, the minimum longitudinal distance between a point of high flux density $B_1$ and low flux density $B_2$ can be shown to be given by the following relationship:

$$2.4n = \frac{B_1}{B_2} - 1 \qquad (1)$$

where $n$ is number of cyclotron rotations between points $B_1$ and $B_2$. This formula is precise insofar as the maximum deviation from true invariance will be less than one percent. The number of cyclotron rotations per unit distance between $B_1$ and $B_2$ can be easily computed by dividing the average cyclotron frequency by the D.-C. beam velocity.

Consider next the interaction process in region 23 of the device of FIG. 1. When signal energy is introduced from source 20 to slow wave circuit 22, the fields associated with the signal wave produce cyclotron waves on the beam. As stated previously, cyclotron waves result from the rotation of beam electrons that are produced by the transverse field components of the signal wave. The phase velocities of such cyclotron waves are defined by successive angular phase positions of the rotating electrons as they pass through a given transverse plane of the beam. If the phase velocity of the signal wave is in approximate synchronism with the phase velocity of the corresponding cyclotron wave of the beam, the two can be made to couple actively, or interact, to produce amplification of the signal wave. The closer the two waves are to exact synchronism the stronger the coupling between them will be. Therefore, to attain the highest possible tube efficiency, it is necessary to determine the phase velocities of the cyclotron waves of the beam and to construct slow wave circuit 22 to retard the longitudinal phase velocity of the signal wave accordingly.

The various beam and circuit parameters that affect synchronization are well known and will not be explored. Equally well known is the fact that the interaction process gradually reduces the D.-C. velocity of the beam. This is due to the ultimate conversion of D.-C. kinetic energy into R.-F. signal wave energy. As would be expected, the reduction in beam velocity causes the cyclotron waves to fall slightly out of synchronism with the signal wave. One method of compensating for this effect is to reduce gradually the longitudinal velocity of the signal wave, as by gradually increasing the pitch of a helix type slow wave circuit in the direction of the collector. For varied reasons, this method has not proven to be practicable, particularly in transverse-field tubes, and consequently, most tubes now built propagate the signal wave in synchronism with the average velocity of the corresponding cyclotron wave.

I have found that a gradually diverging magnetic field in the interaction region, wherein the flux density decreases with distance as shown in FIG. 2, is effective in maintaining synchronism between the signal and the beam in a transverse-field device. The phase constant of the signal wave is $$\frac{\omega}{v_t}$$

where $\omega$ is the signal frequency and $v_t$ is the retarded phase velocity of the signal wave as it propagates along the slow wave circuit. It can be shown that the phase constant of a cyclotron wave of frequency $\omega$ is $$\frac{\omega + \omega_c}{v_0}$$

where $\omega_c$ is the cyclotron frequency and $v_0$ is the D.-C. beam velocity. The cyclotron frequency is determined by the well-known relationship:

$$\omega_c = B\eta \qquad (2)$$

where $\eta$ is the charge-to-mass ratio of an electron. The problem of maintaining synchronism between the electromagnetic signal wave and the cyclotron wave therefore becomes the problem of maintaining the equality:

$$\frac{\omega}{v_t} = \frac{\omega + B\eta}{v_0} \qquad (3)$$

Approaching the problem from this standpoint, it can be appreciated that a gradual decrease of the flux density B can compensate for a gradual decrease of D.-C. beam velocity $v_0$ to maintain the equality of Equation 3 and hence the desired condition of synchronism.

Figure 4:
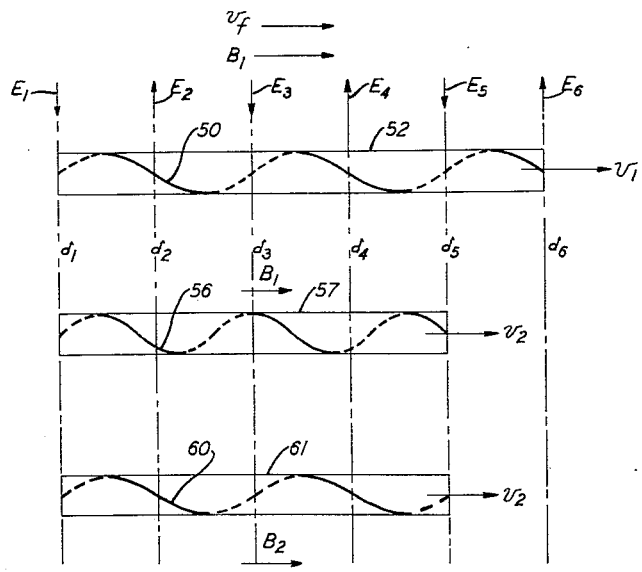
FIG. 4 is a longitudinal sectional view of a magnetic circuit which can alternatively be used in the device of FIG. 1.

A physical illustration of this phenomenon is given in FIG. 4. The direction of propagation of the circuit signal wave of frequency $\omega$ is given by $v_t$. The transverse fields resulting therefrom at one given instant in time are shown by vectors $E_1$ through $E_6$ which are located at distances $d_1$ through $d_6$. The phase positions of successive electrons forming a cyclotron wave of frequency $\omega$ on an electron beam 52 are shown by curve 50. The flux density $B_1$ in beam 52 is chosen such that cyclotron wave 50 is in synchronism with the alternating field vectors $E_1$ through $E_6$ when the beam travels at a D.-C. velocity $v_1$. It should be noted that if the beam is infinitely thin, curve 50 represents a side view of the beam at the instant in time which is considered.

Beam 57 is identical with beam 52 except that its velocity $v_2$ is lower than $v_1$. Because the moving frame of reference (beam 57 at velocity $v_2$) is not properly coordinated with the signal wave, cyclotron wave 56 is 90 degrees out of synchronism at position $d_3$ and 180 degrees out of synchronism at position $d_5$.

In beam 61, the flux density $B_2$ is adjusted to compensate for the difference in velocities of $v_1$ and $v_2$. From Equation 3, this is done by adjusting $B_2$ such that:

$$\frac{\omega + B_1\eta}{v_1} = \frac{\omega + B_2\eta}{v_2} \qquad (4)$$

By making $B_2$ lower than $B_1$ by a predetermined amount, each individual electron travels a longer longitudinal distance during each cycle of rotation, and the phase velocity of the cyclotron wave is effectively increased. When Equation 4 is fulfilled, cyclotron wave 60 on beam 61 will be in synchronism with the signal wave to the same extent as cyclotron wave 50.

From the foregoing considerations, it can be seen that the rate of magnetic field divergence in interaction region 23 must be ascertained by predicting the reduction in velocity of the electron beam. With reference to Equation 4, one should let $B_1$ and $v_1$ equal the flux density and beam velocity at the upstream end of interaction region 23. By calculating the amount of kinetic power which will be given up from the beam to the signal wave, one can closely approximate the beam velocity $v_2$ at the downstream end of the interaction region and thereby solve for $B_2$ the desired flux density at the downstream end of interaction region 23. The magnetic field should then be shaped to diverge uniformly from $B_1$ to $B_2$ to provide constant compensation for beam velocity reduction and also to fulfill the aforementioned condition of adiabatic invariance. For more precise approximations of $v_2$, certain second order effects should be taken into account such as the conversion of rotational electron energy into D.-C. kinetic energy due to transverse magnetic flux components. As will be explained hereinafter, direct use of this effect is made in output section 25.

Collector 12 of tube 10 is "depressed" or biased at a lower positive potential, by means of a battery 65, than the slow wave circuit 22. Capacitors 66 and 67 prevent D.-C. current from being transmitted by coaxial cables 21 and 31 while chokes 68 prevent R-F wave energy from being transmitted to battery 65 and short-circuited between coils 28 and 29. As the beam approaches collector 12, its longitudinal velocity is reduced by the low potential collector. This is desirable in that the beam impinges on collector 12 with less impact; and losses due to heat radiation and secondary emission are thereby reduced. When the beam leaves interaction region 23, however, it contains residual cyclotron wave energy which would be dissipated were it not for the diverging magnetic field.

With reference to FIG. 3, it was previously pointed out that a diverging magnetic field inevitably results in transverse flux density components $B_t$ that are directed radially away from the tube axis. Considering electron 38, these transverse flux components are always at right angles with the transverse velocity component $v_t$. By the left-hand rule a force is exerted "into the paper" on electron 38 which tends to increase its D.-C. velocity. It should also be noted that $B_t$ combines with the longitudinal velocity vector of electron 38 to produce a force which constantly opposes the transverse velocity $v_t$. The result of these actions is the conversion of transverse or rotational kinetic energy into D.-C. longitudinal kinetic energy. In considering the effect on displaced electron, such as electron 42, it can be appreciated that since the transverse flux density components extend radially, their effects are mutually cancelled at the central axis of the tube. Hence, electron 42 will lose more rotational energy in the phase position shown than it will gain when it advances one-half cycle to a position in which its velocity component is in an opposite direction. All rotating electrons will therefore experience a conversion of transverse or rotational energy to D.-C. energy in collector section 25. Hence, substantially all of the beam's kinetic energy is reduced by the depressed collector 12, and dissipative losses are minimized.

From FIG. 2 it is noted that the rate of change of flux density with respect to distance, designated by the angle $\alpha$, is the same as that in the gun region. This indicates that the change of flux density is adiabatic. If the change was not adiabatic, displaced electrons such as electron 41 would be given transverse velocity components which would defeat the purpose of this feature. The collector region is, however, made as short as possible to conserve tube length. Equation 1 describes the appropriate length for collector region 25 as well as gun region 24.

The embodiment of FIG. 1 illustrates how the magnetic field produced by a conventional solenoid 33 can be shaped by a field shaper 35 to give the desired field distribution illustrated in FIG. 2. FIG. 5 is a schematic representation of an alternative focusing system. For purposes of simplicity, the only tube elements shown are cathode 13 and collector 12. The solenoid 46 has a variable number of windings along the tube length. There are a very large number of windings surrounding cathode 13 to produce the desired high flux density thereat. The number of windings uniformly decreases with distance in gun region 24 to produce the uniformly diverging field represented by the angle $\alpha$ in FIG. 2. The rate of decrease in collector region 25 is the same as in the gun region to produce the same rate of field divergence. It is to be noted that the rate of change of diameter with distance of the solenoid produces a corresponding rate of change of flux density along the entire tube length. This embodiment has the advantage of low power requirements; a very high magnetic field is produced only at the cathode end of solenoid 46, thereby obviating the necessity of producing correspondingly high electric power along the entire solenoid.

From the foregoing, it is seen that a diverging field along the length of a transverse field tube permits the use of a high magnetic field at the cathode, maintains synchronism between the signal wave and the beam, and converts residual rotational energy to D.-C. energy for efficient collection. The embodiments shown for effecting these results have merely been illustrative; numerous other arrangements may be devised by those skilled in the art without departing from the spirit and scope of this invention.

What is claimed is:

1. An electron discharge device comprising means for forming and projecting a beam of electrons along a path, means for collecting said beam, means for producing a magnetic flux throughout said beam, said magnetic flux causing said electrons to rotate when a force transverse to said path is applied to said electrons, means comprising a source of electromagnetic wave energy for modulating the rotational kinetic energy components of said electrons, means for causing the density of said flux to decrease with distance from said beam forming means to said beam collecting means, the flux density reduction being so gradual with respect to distance that the number of electron rotations between any point of high flux density and any point of low flux density is at least $$\frac{\left(\frac{B_1}{B_2}-1\right)}{2.4}$$

where $B_1$ is the flux density at said point of high flux density and $B_2$ is the flux density at said point of low flux density.

2. A transverse-field device comprising a cathode for forming and projecting a beam of electrons, said beam being characterized by a spurious cyclotron wave noise content, means for minimizing said cyclotron wave noise content comprising means for producing a high magnetic flux density throughout said cathode, a source of electromagnetic signal waves, input means coupled to said source means including said input means for producing signal cyclotron waves on said beam, means for causing said signal cyclotron waves to interact with said electromagnetic signal waves, and means for causing said flux density to decrease with distance from said cathode to said input means.

3. The transverse-field device of claim 2 wherein said spurious cyclotron wave noise content is characterized by spurious rotational velocity components of certain of said electrons, the rate of decrease with respect to distance of said flux density being substantially uniform and being substantially determined by the relationship:

$$2.4n = \frac{B_1}{B_2} - 1$$

where $B_1$ is the flux density at the cathode, $B_2$ is the flux density at the input means, and $n$ is the number of electron rotations between the cathode and the input means.

4. An electron discharge device comprising means for forming and projecting a beam of electrons along a path at a certain D.-C. velocity, a source of electromagnetic signal wave energy, means for producing cyclotron waves in said electron beam, means for producing interaction between said cyclotron waves and said signal wave energy comprising means extending along a portion of said path for propagating said signal wave energy in approximate synchronism with said cyclotron waves, said propagating means defining an interaction region, the interaction being characterized by an amplification of said signal wave energy and a gradual reduction in said D.-C. beam velocity, and means for maintaining synchronism between said signal energy and said cyclotron waves despite said reduction in D.-C. beam velocity comprising means for producing a magnetic field which substantially uniformly diverges along said interaction region in the direction of said signal wave energy propagation, whereby a magnetic flux density is produced in said interaction region that decreases with distance in the direction of signal wave propagation.

5. The high frequency amplifier of claim 4 wherein the rate of magnetic field divergence is substantially determined by:

$$\frac{\omega + B_1\eta}{v_1} = \frac{\omega + B_2\eta}{v_2}$$

where $B_1$ is the flux density at a first point in the interaction region, $B_2$ is the flux density at a second point in the interaction region, $\omega$ is the signal frequency, $\eta$ is the charge-to-mass ratio of an electron, $v_1$ is the D.-C. beam velocity at said first point and $v_2$ is the D.-C. beam velocity at said second point.

6. A cyclotron wave device comprising electron gun means for forming and projecting a beam of electrons, a collector for collecting said beam, a signal wave input means adjacent said gun means, a signal wave output means adjacent said collector, said input and output means defining therebetween an interaction region, transmitting means extending along said interaction region for causing interaction between signal waves propagating thereon and the cyclotron mode of said beam, said interaction process resulting in residual rotational energy components on said electrons as they emerge from said interaction region, means for converting said residual rotational energy components to longitudinal kinetic energy comprising means for producing a magnetic field throughout said beam that diverges with distance from said output means to said collector, whereby a magnetic flux density is produced in said beam that decreases with distance from said output means to said collector, and means for reducing the longitudinal kinetic energy of said beam between said output means and said collector comprising a low potential voltage source connected to said collector.

7. The cyclotron wave device of claim 6 wherein said magnetic field divergence is substantially uniform, and the rate of magnetic field divergence is substantially given by:

$$2.4n = \frac{B_1}{B_2} - 1$$

where $B_1$ is the flux density at the output means, $B_2$ is the flux density at the collector, and $n$ is the number of electron rotations between the output means and the collector.

8. A high frequency amplifier comprising an electron gun for forming and projecting a beam of electrons, a collector for collecting said beam, signal wave input means and signal wave output means interposed between said electron gun and said collector, said electron gun and said input means defining a gun region therebetween, said input and said output means defining an interaction region therebetween, said output means and said collector defining a collector region therebetween, transmitting means extending along said interaction region for causing interaction between signal waves propagating thereon and the cyclotron mode of said beam, and means for producing a magnetic flux along said beam, the density of which decreases with distance from said gun to said collector, the flux density gradient in said gun region and said collector region between any point $a$ of high flux density and any point $b$ of low flux density being substantially given by:

$$2.4n = \frac{B_1}{B_2} - 1$$

where $B_1$ is the flux density at point $a$, $B_2$ is the flux density at point $b$ and $n$ is the number of electron rotations between $a$ and $b$, and the flux density gradient in said interaction region between any point $c$ of high flux density and any point $d$ of low flux density being substantially determined by:

$$\frac{\omega + B_1\eta}{v_1} = \frac{\omega + B_2\eta}{v_2}$$

where $B_1$ is the flux density at point $c$, $B_2$ is the flux density at point $d$, $v_1$ is the D.-C. beam velocity at point $c$, $v_2$ is the D.-C. beam velocity at point $d$, $\omega$ is the signal frequency and $\eta$ is the charge-to-mass ratio of an electron.

References Cited in the file of this patent

UNITED STATES PATENTS

| | | |
|---|---|---|
| 2,159,534 | Ruska | May 23, 1939 |
| 2,807,743 | Cioffi | Sept. 24, 1957 |
| 2,822,500 | Bryant | Feb. 4, 1958 |
| 2,871,395 | Cioffi | Jan. 27, 1959 |
| 2,941,111 | Veith et al. | June 14, 1960 |
| 2,955,225 | Sterzer | Oct. 4, 1960 |